US012100296B2

(12) United States Patent
Cornelius et al.

(10) Patent No.: US 12,100,296 B2
(45) Date of Patent: Sep. 24, 2024

(54) TRAFFIC SIGNAL ASSEMBLY WITH HEATING ELEMENT

(71) Applicant: TRAMEC, LLC, Shawnee, KS (US)

(72) Inventors: Kevin Michael Cornelius, Lees Summit, MO (US); Alec Michael Holm, Bloomingdale, IL (US); Jay Martin Pawlak, Eau Claire, WI (US); Robert Frank Tumminaro, Oregon, IL (US)

(73) Assignee: Tramec, LLC, Shawnee, KS (US)

( * ) Notice: Subject to any disclaimer, the term of this patent is extended or adjusted under 35 U.S.C. 154(b) by 96 days.

(21) Appl. No.: 17/893,699

(22) Filed: Aug. 23, 2022

(65) Prior Publication Data

US 2024/0071218 A1 Feb. 29, 2024

(51) Int. Cl.
*G08G 1/095* (2006.01)
*F21V 29/90* (2015.01)

(52) U.S. Cl.
CPC .................................... *G08G 1/095* (2013.01)

(58) Field of Classification Search
None
See application file for complete search history.

(56) References Cited

U.S. PATENT DOCUMENTS 10,223,913 B2 3/2019 Bichon
2010/0149785 A1 6/2010 Dubuc
2021/0174676 A1 6/2021 Cubon
2022/0078889 A1* 3/2022 Bhogal ................ H05B 1/0263
2022/0090774 A1* 3/2022 Van Straten ............. H05B 3/18

FOREIGN PATENT DOCUMENTS

KR 102444890 B1 9/2022

OTHER PUBLICATIONS

SNI Solutions, Anti De-Icing, https://www.snisolutions.com/antiicing.html?ver=429, access Nov. 29, 2022.
McCain, Inc., Scoop Tunnel Visor Feb. 28, 2012.
Fortran Traffic, Snow Sentry, https://www.fortrantraffic.com/products/snow-sentry, accessed Nov. 29, 2022.
Eurpoean Patent Office, Search Report in corresponding EP Application No. 23187624.4, Jan. 19, 2024, 10 pages.

* cited by examiner

*Primary Examiner* — John F Mortell
(74) *Attorney, Agent, or Firm* — McGarry Bair PC

(57) ABSTRACT

A traffic light assembly and method for controlling a set of heating elements for the traffic light assembly. A traffic signal with a lens and a visor, the visor having an inner surface and extending from the lens. A sensor mounted to the traffic signal and in direct communication with an environment surrounding the traffic light assembly. A control module located within the traffic signal, the control module comprising a controller for implementing a primary loop that continuously checks environmental conditions via the sensor to determine if a predetermined condition is met.

19 Claims, 8 Drawing Sheets

TRAFFIC SIGNAL ASSEMBLY WITH HEATING ELEMENT

TECHNICAL FIELD

The disclosure generally relates to a heating element, and more specifically to a heating element for a traffic signal.

BACKGROUND

Traditionally, traffic signals have utilized incandescent bulbs to illuminate lenses for the control of traffic flow. The use of light-emitting diodes (LEDs) instead of incandescent bulbs has been growing in popularity due to their longer lifespan as well as a reduction in electric current draw. One negative of utilizing LEDs in lenses for traffic signals is that they do not produce enough heat to melt away snow and ice in inclement weather.

Currently deicing the lenses of traffic signals include a municipal employee in a boom truck using a broom or other tool to knock the snow and ice off the lenses. While other deicing methods exist, a physical inspection/intervention, the products currently available have fallen short of ensuring snow/ice does not build up.

BRIEF DESCRIPTION OF THE DRAWINGS

A full and enabling disclosure, including the best mode thereof, directed to one of ordinary skill in the art, is set forth in the specification, which refers to the appended figures in which.

DETAILED DESCRIPTION

Figure 1:
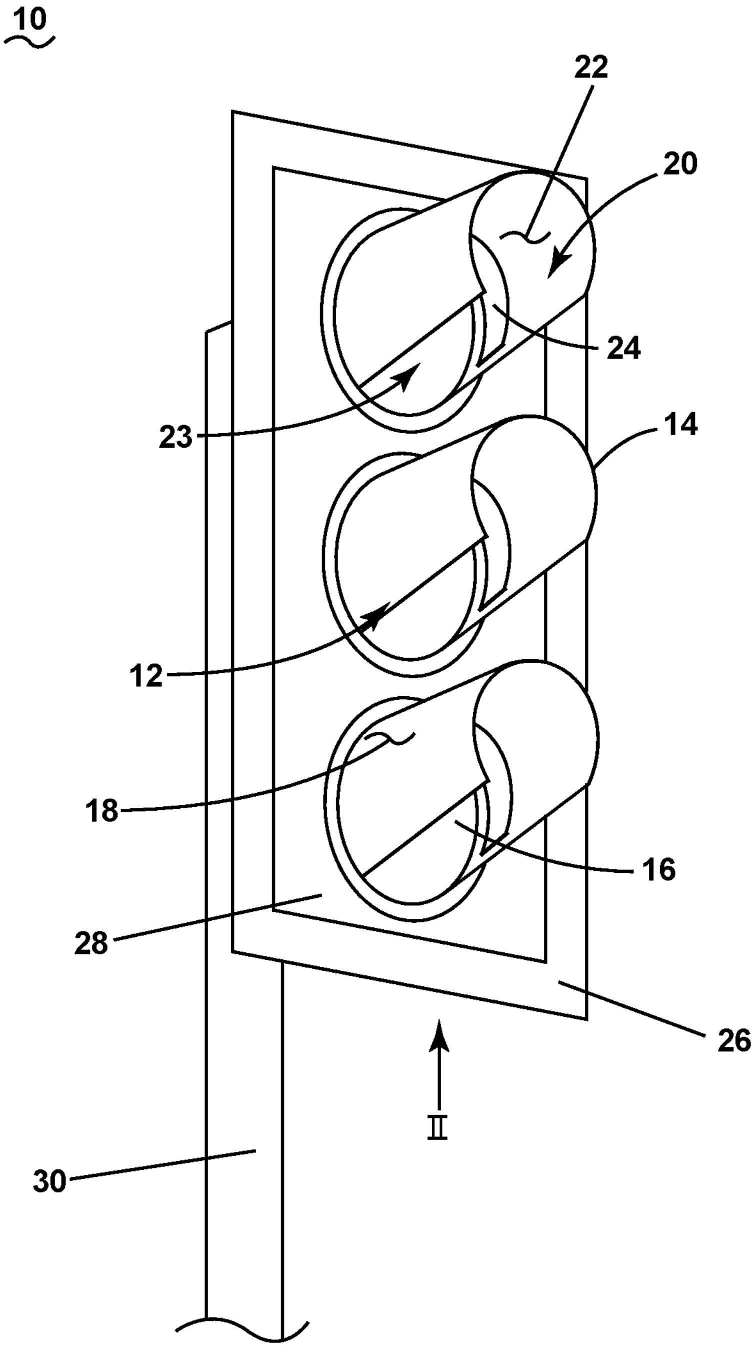
FIG. 1 is perspective view of a traffic signal with three signal housings and a set of heating elements.

Aspects of the disclosure described herein are directed to a set of heating elements for a traffic signal. More specifically an apparatus and method for controlling the power to each heating element in the set of heating elements. For purposes of illustration, the present disclosure will be described with respect to a set of heating elements for a traffic signal. It will be understood, however, that aspects of the disclosure described herein are not so limited and may have general applicability within other applications including industrial, commercial, and residential applications.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Traffic signals include traffic lights, commonly three traffic lights, a red, yellow, and green light. Light-emitting diodes (LEDs) have replaced traditional incandescent bulbs in most traffic lights due to their longer lifespan and lower electric current draws. The lower electric current draw causes LEDs to produce less heat than incandescent bulbs. Therefore, this replacement while more energy efficient, can result in more snow and/or ice build-up on the lenses for the traffic lights. Current methods for "deicing" include a municipal employee in a boom using a broom to knock the snow and ice off the lenses. This is cost prohibitive and presents a hazard to motorists, since it can only happen when a person intervenes and knocks the snow and ice off the lens. Passive methods for "deicing" exist such as lens covers, airflow direction for blowing snow off, and chemical sprays which need to be sprayed on prior to snow events. A more active solution includes using an imbedded wire in the lens to heat the lens and melt snow off the lens. However, both the passive and active solutions do little with regards to preventing or melting an ice dam built up over time. Further, the current draw saved by replacing the incandescent bulbs with LEDs is essentially canceled out by the draw needed for the imbedded wire.

To effectively deice the lenses and provide more adequate management of power consumption a heating element located on the visor portion of the traffic light is described herein. The at least one heating element warms during certain weather conditions and melts the snow and ice off, or prevents it from sticking in the first place. To reduce the additional current draw needed for the at least one heating elements, a method for operating the at least one heating elements with a control module is also described herein. The at least one heating element and control module for controlling the at least one heating element minimizes an amount of current drawn while still ensuring that the snow and ice cannot build up or is melted away when and/or if it does build up.

FIG. 1 illustrates a traffic light assembly 10 with a set of heating elements 20. By way of non-limiting example, the traffic light assembly 10 includes three traffic signals 12 oriented in a vertical alignment. Each traffic signal 12 can include a visor 14 and a lens 16. Each visor 14 can include an outer surface 18 and an inner surface 22 facing the lens 16 and defining a protected area 23. The set of heating elements 20 can include at least one heating element 24 illustrated as multiple individual heating elements 24. Each at least one heating element 24 can be mounted on an inner surface 22 of the visor 14. The at least one heating element 24 can be a positive temperature coefficient heater or a fixed-resistance heater. The at least one heating element 24 can be adhesively or otherwise mounted to the visor 14. While illustrated as a traffic light assembly 10 in a vertical orientation, it should be understood that the traffic light assembly 10 can be any traffic light utilized for controlling the flow of traffic along a road, including but not limited to a horizontal orientation or a single traffic signal.

The traffic light assembly 10 can include a back plate 26 with a signal head 28 for mounting each traffic signal 12. The traffic light can be mounted to a pole 30 for placement at an intersection. It should be understood that the traffic light can be mounted to the pole 30 as illustrated, or otherwise located in an intersection by way of non-limiting example affixed to and hanging from a cable system. While illustrated as distinct parts, the backplate 26, housing and visor can be a singular piece, or two pieces depending on manufacturing and product placement.

Figure 2:
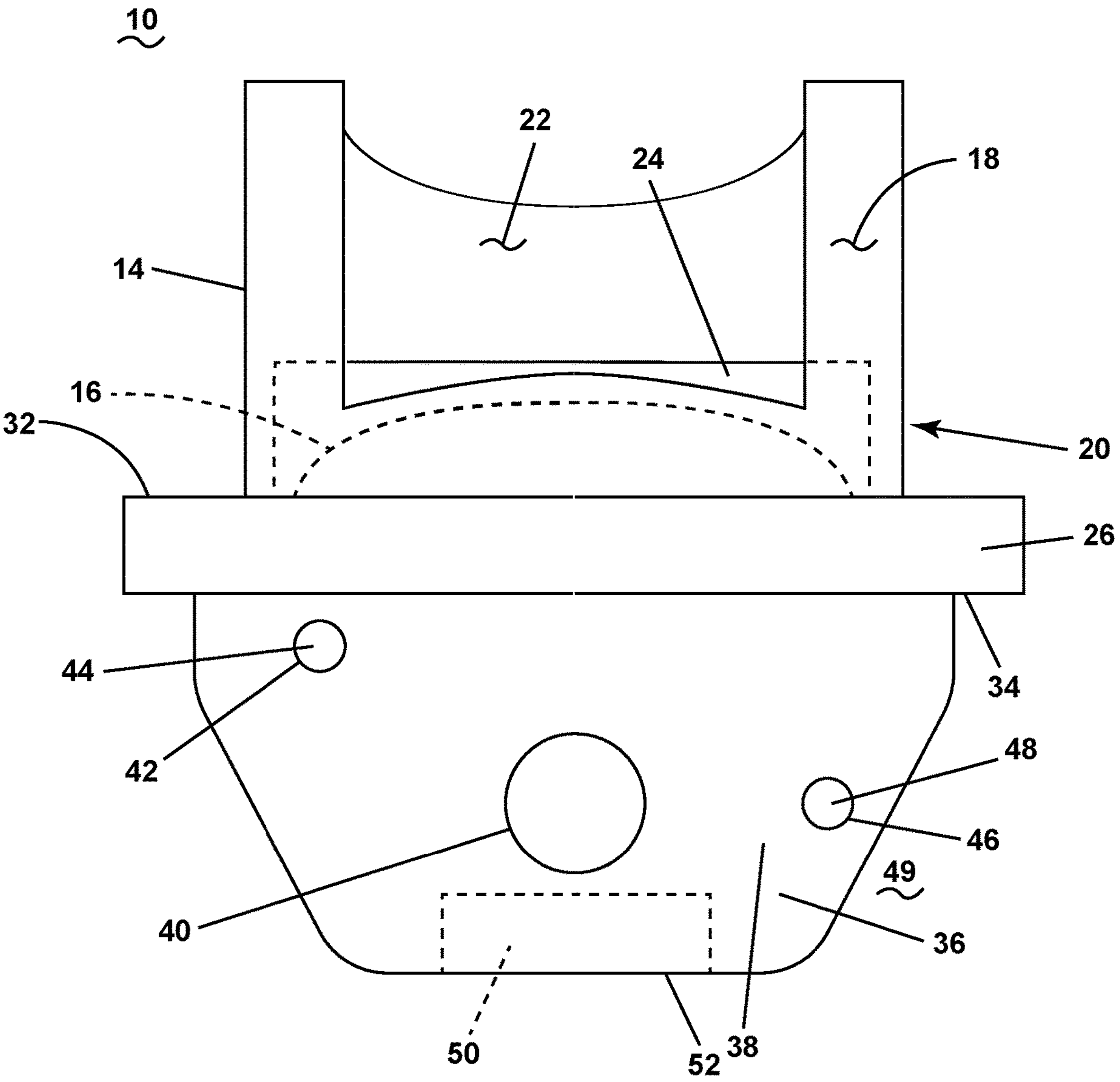
FIG. 2 is a bottom view along line II of FIG. 1 illustrating a heating element location for the set of heating elements, an LED location, and a sensor location in a signal housing.

FIG. 2 is a bottom view along line II of the traffic light assembly 10 from FIG. 1. The back plate 26 includes a front side 32 from which the visor 14 extends and a back side 34. A signal housing 36 can be mounted to and extend from the back plate 26 along the back side 34. A base 38 of the signal housing 36 is illustrated. A pole aperture 40 can be located in the base 38 of the signal housing 36 for receiving the pole 30 (FIG. 1). An indicator aperture 42 can be located in the base 38 proximate the back plate 26 for receiving an indicator, by way of non-limiting example an LED 44. A sensor aperture 46 can be located in the base 38 at a location spaced from the back plate 26 for housing an environmental sensor 48. The environmental sensor 48 can extend out from the base 38 to be in direct contact with an environment 49 surrounding the traffic light assembly 10. A control module 50 can be located within the signal housing 36 along a back wall 52 of the signal housing 36. In operation, the LED 44 can indicate the status of the control module 50.

Figure 3:
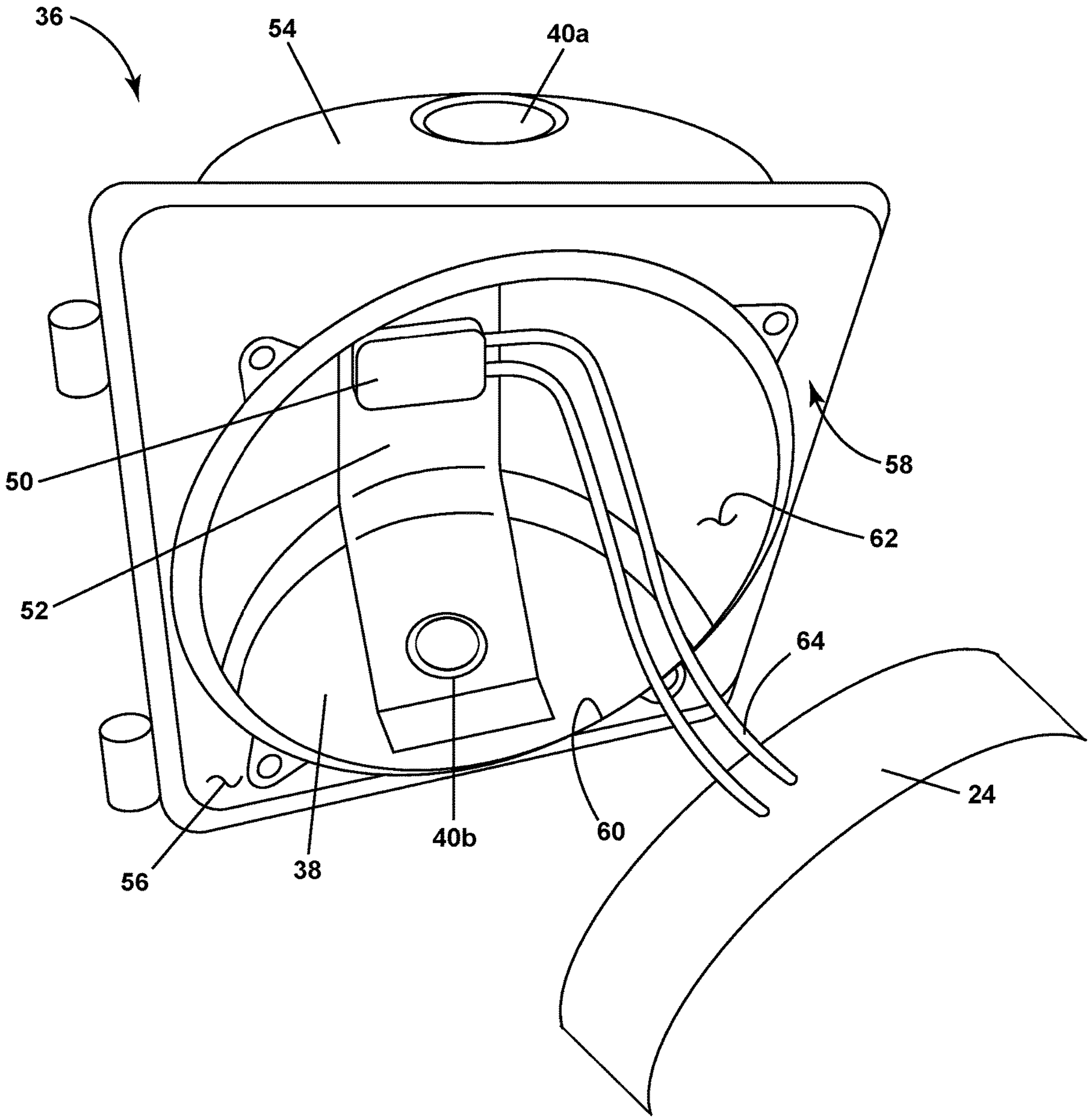
FIG. 3 is a perspective view of a signal housing with a control module for controlling the heating element.

Turning to FIG. 3, a perspective view of the signal housing 36 is illustrated. The signal housing 36 can extend vertically between the base 38 and a top 54. A signal plate 56 can define a front 58 of the signal housing 36 and include a lens opening 60 for mounting the lens 16 (not shown). Sidewalls 62 along with the back wall 52 further define the signal housing 36. It can more clearly be seen that the control module 50 can be mounted to the back wall 52 in between sequential pole apertures 40*a*, 40*b*. Wires 64 can connect the at least one heating element 24 to the control module 50.

Figure 4:
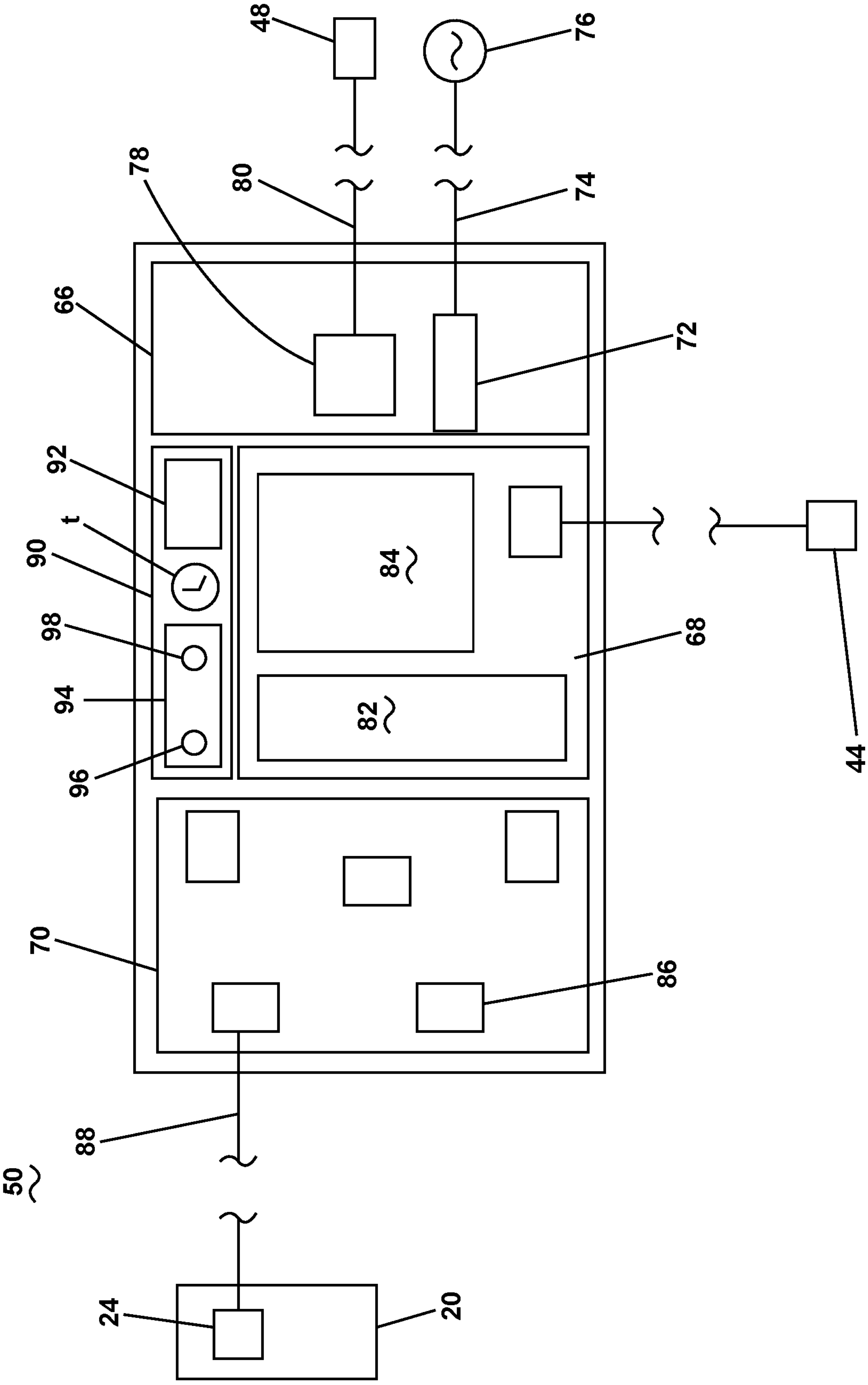
FIG. 4 is a schematic of the control module from FIG. 3.

FIG. 4 is a schematic of the control module 50 including an input port section 66, a power source section 68, and an output port section 70. The input port section 66 can include a first keyed port 72 for a power input 74 connected to a power supply 76. A second keyed port 78 can be located in the input port section 66 for a sensor input 80 connected to the environmental sensor 48. The power source section 68 can include a DC power source 82 and a power converter 84. Further, the power source section 68 can provide power to the LED 44. The output port section 70 can include multiple heater output ports 86 for a heater output 88 connected to each heating element 24. While five heater output ports 86 are illustrated, it should be understood that the control module 50 described herein is not so limited.

A controller 90 is located in the control module 50. The controller 90 can include a microprocessor 92, a timer (denoted "t"), and an on/off indicator 94. The on/off indicator can include a green light 96 and a red light 98. The controller 90 is programmed to turn the set of heating elements 20 on in a cascade sequence. In other words, no more than two heating elements 24 in the set of heating elements 20 is on at any one time. The cascade sequence enables a cycle between visors 14, for example the three visors illustrated in FIG. 1. In the event five visors, each with a heating element 24 is contemplated, a power consumption savings can be greater than 60% for all five of the at least one heating elements 24 by utilizing the cascade sequence described in further detail in FIG. 5 as well as a soft-start feature illustrated and described in FIG. 7.

It should be understood that the control module 50 can include any number of electrical components, including, but not limited to, resistors, capacitors, interface connectors, a microprocessor, and switches affixed to a printed circuit board (PCB), which is then embedded into a housing. The components on the PCB allow for the interface of the power supply 76 with the power source section 68 and in turn the LED 44, the environmental sensor 48, and the plurality of heater output ports 86. Control code is loaded onto the device, by way of non-limiting example in the microprocessor 92, which is then potted to environmentally seal exposed conductors. The control code consists of a primary loop 100 that continuously checks environmental conditions via the environmental sensor 48 to determine if a set of variable preset conditions are met to begin the cascade sequence. The set of variable preset conditions can include a first environmental temperature value, a low-temperature cut-off value, a first relative humidity value and a low-humidity cut-off value. The values for the set of variable preset conditions are dependent on the environment of the location of the traffic light assembly 10. In a non-limiting example, the set of variable preset conditions can have the following values. The first environmental temperature value can be 38° F., the first relative humidity value can be 50%. The low-temperature cut-off (denoted "X° F.") can range between −10° F. and 30° F. and the low-humidity cut-off (denoted "Y %") can range between 25% and 75%.

Figure 5:
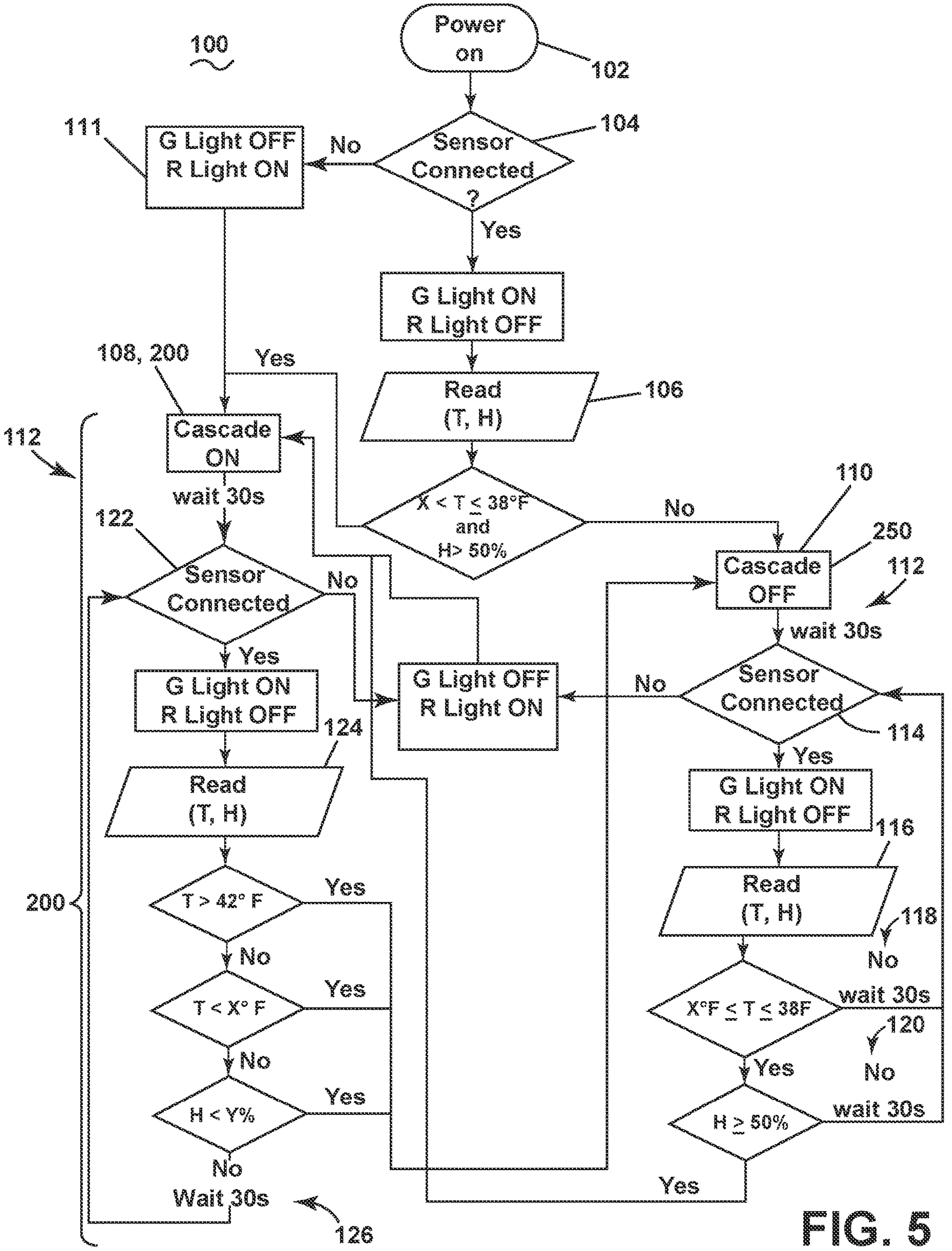
FIG. 5 flow chart illustrating a primary loop for controlling the set of heating elements including a cascade on loop and a cascade off loop.

FIG. 5 is a flow chart of the primary loop 100 for the control module 50 from FIG. 4. If certain environmental conditions are met, a cascade subroutine 202 will power up to two heating elements at a time, sequentially depowering one and powering another at a predetermined interval. After powering on the control module 50 at 102, the controller 90 determines whether sensor 48 is connected at 104. It should be understood that while the cascade subroutine 202 is described as powering up two heating elements, it is contemplated that more than two heating elements are powered up as long as others are depowering or off.

If the sensor 48 is connected, the green light 96 is on while the red light 98 is off, if the sensor 48 is not connected, the green light 96 is off while the red light is on. An "on" green light 96 initiates at 106 a check of the environmental conditions including an environmental temperature (denoted "T") and a humidity (denoted "H") reading for the environment 49. If a first predetermined environmental condition is met where the environmental temperature T is greater than the low-temperature cut-off X° F. and below or equal to 38° F. (X° F.<T≤38° F.) and the humidity H is greater than 50% (H>50%) a cascade on loop 200 is initiated at 108. If the first predetermined environmental condition is not met and the environmental temperature is above 38° F. (T>38° F.) or less than or equal to the low-temperature cut-off of X° F. (T≤X° F.) and the humidity is less than or equal to 50% (H≤50%) a cascade off loop 250 is initiated at 110.

If the sensor 48 is not connected, the green light 96 is off and the red light 98 is on. This can indicate a scenario such as that the sensor may need to be replaced, or that a wire is not properly connected. In any case, in the event the sensor 48 is determined to not be on, the control module 50 causes the cascade on loop 200 to initiate as previously described such that the control module 50 fails "on" at 111. In other words, in order to ensure little to no ice build-up even in the event a sensor is not working, the cascade on loop 200 will remain engaged. An "on" red light 98 will always initiate the cascade on loop 200 at 108.

At 112 the timer "t" is set for 30 seconds regardless of which loop, the cascade on loop 200 or if the cascade on loop 200, has been initiated. In the event the cascade on loop 200 remains off, at 114 the controller 90 determines whether sensor 48 is connected. Again, an "on" green light 96 initiates the temperature and the humidity reading at 116. If the environmental temperature T is above 38° F. (T>38° F.) or below the low-temperature cut-off X° F. (X° F.>T), the timer is set again for 30 seconds at 118 and the cascade off loop 250 is initiated, or remains off at 110 until the 30 seconds ends at which the cycle restarts at block 114. If the environmental temperature T is between or equal to the low-temperature cut-off X° F. and 38° F. (X° F.≤T≤38° F.) but the humidity H is less than 50% (H<50%) the timer is set again for 30 seconds at 120 and the cascade off loop 250 is initiated, or remains off at 110 until the 30 seconds ends at which the cycle restarts at block 114. If a first predetermined environmental condition is met where the temperature T is between or equal to the low-temperature cut-off X° F. and 38° F. (X° F.≤T≤38° F.) and the humidity H is greater than or equal to 50% (H≥50%) a cascade on loop 200 is initiated at 108.

Upon completion of the 30 seconds at 112, at 122 the controller determines whether sensor 48 is connected. Again, an "on" green light 96 initiates the temperature and the humidity reading at 124. If a second predetermined environmental condition is met where the temperature is above 42° F. (T>42° F.) or less than the low-temperature cut-off (T<X° F.) or the humidity is less than the low-humidity cut-off of Y % (H<Y %) the cascade off loop 250 is initiated at 110. If the second predetermined environmental condition is not met and the environmental temperature is below or equal to 42° F. (T≤42° F.) and the humidity is greater than 50% (H>50%) the timer is set again for 30 seconds at 126, and the temperature T is above or equal to the low-temperature cut-off of (T≥X° F.), and the humidity H is greater than the low-humidity cut-off (H≥Y %) the cascade on loop 200 continues, or remains on at 108 until the 30 seconds ends at which the cycle restarts at block 122.

Figure 6:
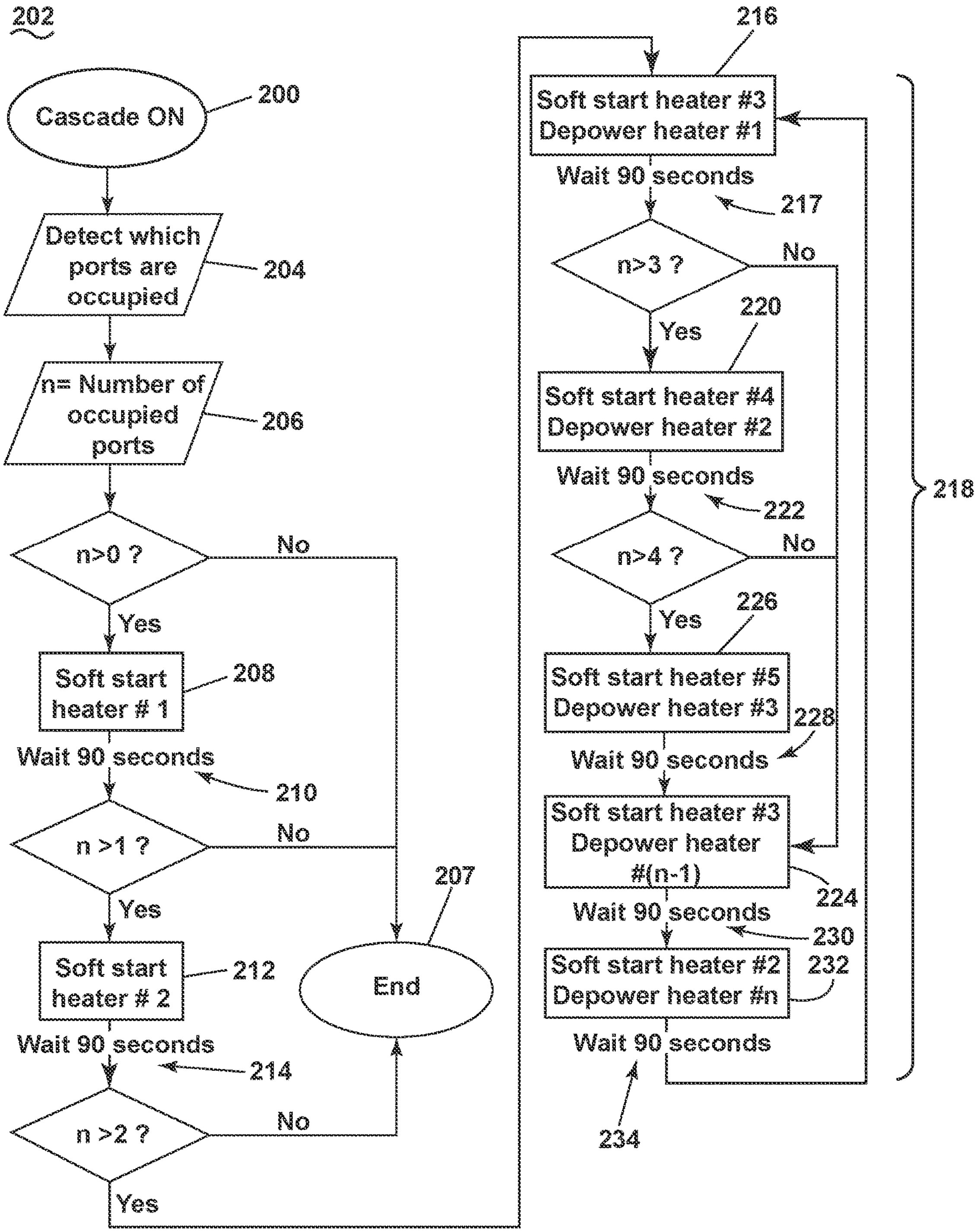
FIG. 6 is a flow chart illustrating the cascade on loop in more detail.

Turning to FIG. 6, a subroutine 202 for the cascade on loop 200 is illustrated. In the event the cascade on loop 200 is initiated, the subroutine 202 can include at 204 detecting which heater output ports 86 are occupied to define a number of ports occupied (denoted "n") at 206. If one or more heater output ports 86 are occupied (n>0) a soft-start program 300 is initiated for a first heating element 24*a* at 208. Upon completion of the soft-start program 300 for the first heating element 24*a*, at 210 the timer "t" is set for 90 seconds.

At 212, if two or more heater output ports 86 are occupied (n>1) the soft-start program 300 is initiated for a second heating element 24*b*, otherwise the subroutine 202 is terminated at 207. At 214 the timer "t" is set for 90 seconds.

At 216 if three or more heater output ports 86 are occupied (n>2) a secondary sequence 218 is initiated where the soft-start program 300 is initiated for a third heating element 24*c* and the first heating element 24*a* is depowered, or turned off, otherwise the subroutine is terminated at 207. Upon completion of the soft-start and depowering at 216, at 217 the timer "t" is set for 90 seconds.

Upon completion of the 90 seconds, at 220 if four or more heater output ports 86 are occupied (n>3) the soft-start program 300 is initiated for a fourth heating element 24*d* and the second heating element 24*b* is depowered, or turned off. Upon completion of the soft-start and depowering at 220, at 222 the timer "t" is set for 90 seconds. If less than four heater output ports 86 are occupied (n<4), the second heating element 24*b*, or the heating element numbered (n−1) is turned off at 224 and the soft-start program 300 is initiated (again) for the first heating element 24*a*.

Upon completion of the 90 seconds, at 226 if five or more heater output ports 86 are occupied (n>4) the soft-start program 300 is initiated for a fifth heating element 24*e* and the third heating element 24*c* is depowered, or turned off. Upon completion of the soft-start and depowering at 226, at 228 the timer "t" is set for 90 seconds. Upon completion of the 90 seconds, the second heating element 24*b*, or the number heater equal to (N−1) is turned off at 224 and the soft-start program 300 is initiated (again) for the first heating element 24*a*. At 230 the timer "t" is set for 90 seconds.

Upon completion of the 90 seconds, the fifth heating element 24*b*, or the number heater equal to (n) is turned off at 232 and the soft-start program 300 is initiated (again) for the second heating element 24*b*. At 234 the timer "t" is set for 90 seconds.

Upon completion of the 90 seconds, the subroutine 202 returns to block 216 where when three or more heater output ports 86 are occupied (n>2) the soft-start program 300 is initiated for a third heating element 24*c* and the first heating element 24*a* is depowered.

Figure 7:
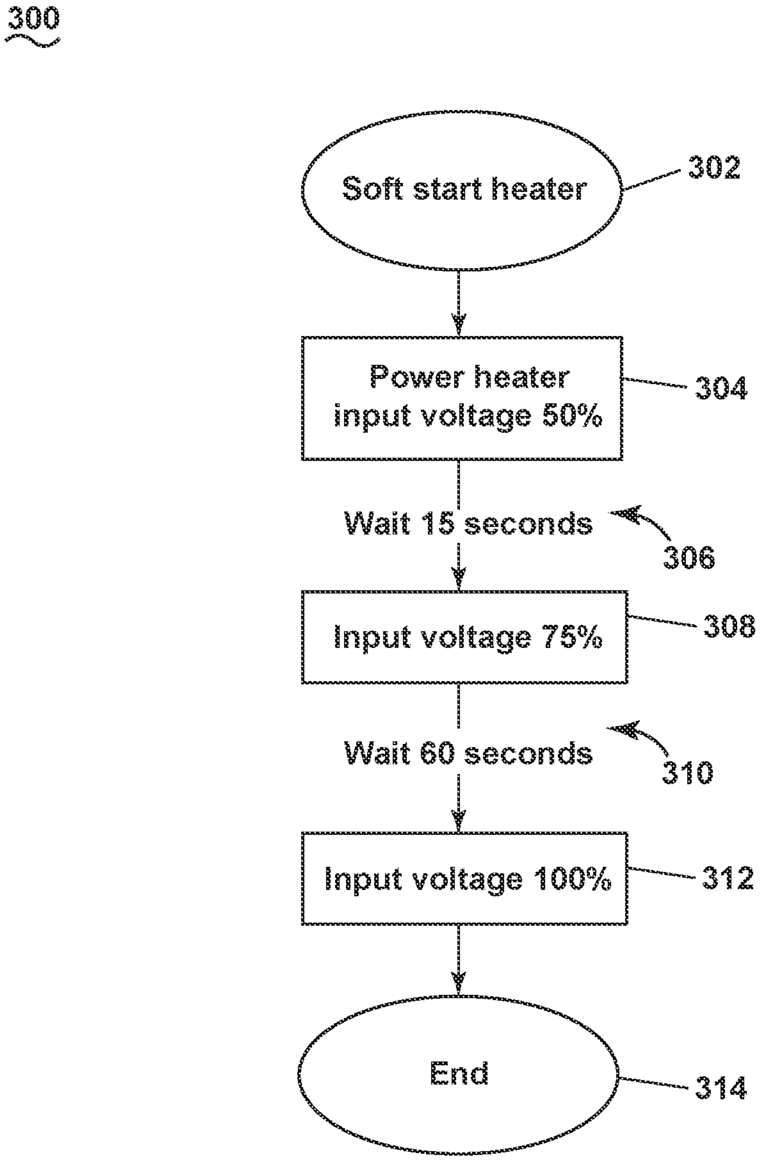
FIG. 7 is a flow chart illustrating the cascade off loop in more detail.

FIG. 7 is a flow chart for the soft-start program 300. At 302, the soft-start program 300 is initiated. When an individual heating element 24 is powered via the cascade subroutine 202, the soft-start program 300 will power the corresponding heating element 24 at a reduced voltage for a short time, then increase the output voltage in three stages. At 304 the at least one heating element 24, including any of the first, second, third, fourth, or fifth heating elements 24*a*, 24*b*, 24*c*, 24*d*, 24*e* described herein, is powered with an input voltage (V) of 50% ($V=0.5V_T$) of a total available input voltage ($V_T$). The timer "t" is set for 15 seconds at 306. Upon completion of the 15 seconds, at 308 the input voltage (V) is increased to 75% ($V=0.75V_T$). The timer "t" is set for 60 seconds at 310. Upon completion of the 60 seconds, at 312 the input voltage (V) is increased to 100% ($V=V_T$). At 314 the soft-start program 300 is terminated. This reduction in voltage further minimizes the power consumption of the set of heating elements 20. It should be understood that the soft-start program overlaps with the other flow charts described herein. Therefore starting the heater at 304 initiates both a 90 second wait that overlaps with the three stages.

Figure 8:
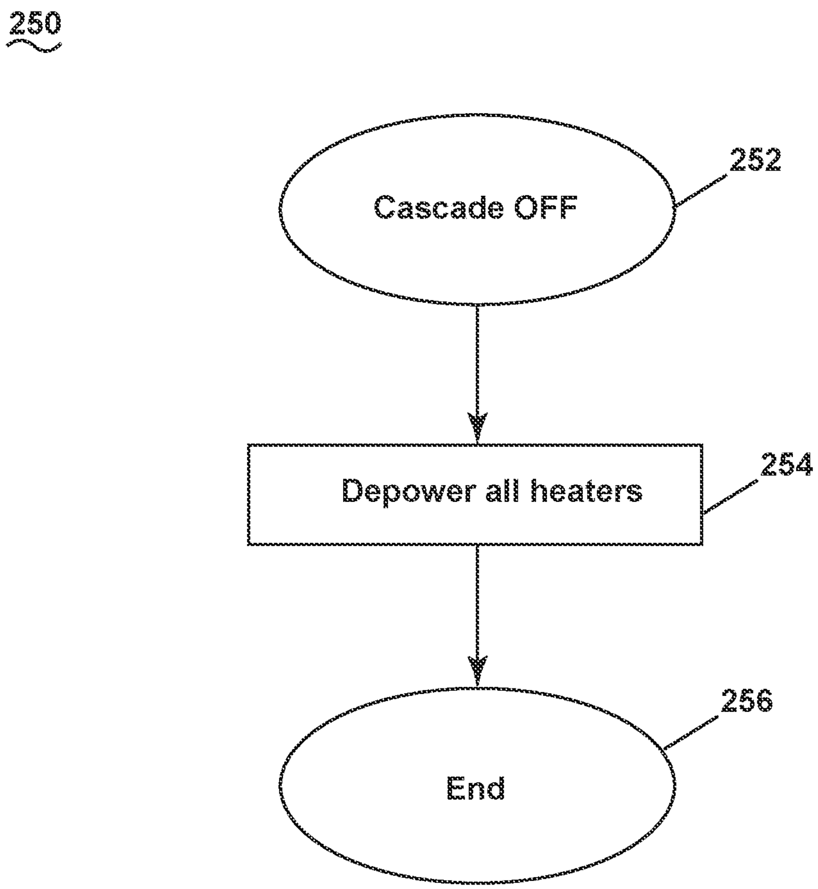
FIG. 8 is a flow chart illustrating a soft start for the primary loop from FIG. 4 according to an aspect of the disclosure herein.

FIG. 8 is a flow chart for the cascade off loop 250. At 252, the cascade off loop 250 is initiated. At 254 the at least one heating elements 24, including any of the first, second, third, fourth, or fifth heating elements 24*a*, 24*b*, 24*c*, 24*d*, 24*e* described herein, are depowered, or turned off. At 256 the cascade off loop 250 is terminated.

A method for controlling the set of heating elements 20 as described previously outlined in the flow charts includes initiating the primary loop 100 to continuously check by sensing with the environmental sensor 48 the environmental conditions in the environment 49. Initiating the cascade on loop 200 and turning at least one heating element 24 in the set of heating elements 20 on when the first predetermined environmental condition is met.

The method can further include initiating the cascade off loop 250 and keeping the at least one heating element 24 in the set of heating elements 20 off in the event the first predetermined environmental condition is not met. The method can further include initiating the cascade off loop 250 in the event the second predetermined environmental condition is met and turning the at least one heating element 24 off.

The method can further include the subroutine 202 including detecting the number (n) of heating elements 24 in the set of heating elements 20 and in an event where the number (n) of heating elements 24 is more than two (n>2), initiating the secondary sequence 218, where no more than two heating elements 24 are on for a set period of time.

Benefits associated with the disclosure as described herein include simultaneously minimizing power consumption by the at least one heating elements while ensuring the prevention of snow/ice build up and/or the melting of snow/ice build up should it occur at the lens of the traffic light. Providing an active solution to snow/ice build up prevents unwanted ice dams within the visor/lens vicinity. Furthermore, unlike other active solutions, the at least one heating elements and method described herein heats the area proximate the lens including the visor. This actively prevents snow/ice build up at the lens and around the lens area.

Further, the control module enables more heating elements to be used at a traffic intersection without sacrificing effectiveness or pulling more current than the traffic intersection has supplied power. The cycling of the at least one heating elements, coupled with the soft-start ramp up of voltage ensures minimizes the amount of energy used while still maintaining snow and ice-free traffic signals.

It should be appreciated that the at least one heating elements, control module, and methods as described herein can be provided for any heating elements and is not limited to the at least one heating elements as described herein. Furthermore, it should be appreciated that the set of heating elements as described herein can have additional applicability to other industries, and is not limited to traffic signals as described herein.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A traffic light assembly comprising:

a traffic signal with a lens and a visor, the visor having an inner surface and extending from the lens, the inner surface at least partially defining a protected area proximate the lens;

at least one heating element located on the inner surface;

a sensor mounted to the traffic signal and in direct communication with an environment surrounding the traffic light assembly; and a control module located within the traffic signal, the control module comprising a controller for implementing a primary loop that continuously checks environmental conditions via the sensor to determine if a predetermined condition is met;

wherein the primary loop includes a cascade on loop and a cascade off loop.

2. The traffic light assembly of claim 1 wherein the traffic signal is multiple traffic signals.

3. The traffic light assembly of claim 2 wherein the at least one heating element is multiple heating elements.

4. The traffic light assembly of claim 3 wherein the control module includes multiple heater outputs ports for connecting with the multiple heating elements.

5. The traffic light assembly of claim 4 wherein the control module turns no more than two heating elements of the multiple heating elements on when an environmental temperature sensed by the sensor is greater than a low-temperature cut-off X° F. and below or equal to 38° F. (X° F.<T<38° F.) and a relative humidity sensed by the sensor is greater than 50% (H>50%).

6. The traffic light assembly of claim 1 wherein the control module initiates the cascade on loop when an environmental temperature sensed by the sensor is greater than a low-temperature cut-off X° F. and below or equal to 38° F. (X° F.<T<38° F.) and a relative humidity sensed by the sensor is greater than 50% (H>50%).

7. The traffic light assembly of claim 6 wherein the controller initiates the cascade off loop when the environmental temperature is above 38° F. (T>38° F.) or less than or equal to the low-temperature cut-off of X° F. (T<X° F.) and the humidity is less than 50% (H<50%).

8. The traffic light assembly of claim 6 wherein the at least one heating element is multiple heating elements and the cascade on loop enables no more than two of the multiple heating elements to be on at any given time.

9. The traffic light assembly of claim 8 wherein the control module includes five heater outputs ports for connecting with any number of heating elements up to five heating elements.

10. A method for controlling a set of heating elements with a control module, the method comprising:

initiating a primary loop including continuously checking an environmental condition by sensing with an environmental sensor an environmental condition in an area surrounding the set of heating elements;

determining if a first predetermined environmental condition is met;

initiating a cascade on loop in an event where the first predetermined environmental condition is met and turning at least one heating element in the set of heating elements on; and having a cascade off loop operating the set of heating elements to be off.

11. The method of claim 10, further comprising initiating a cascade off loop in the event the first predetermined environmental condition is met and keeping the at least one heating element off.

12. The method of claim 11 wherein the predetermined environmental condition is whether an environmental temperature is greater than a low-temperature cut-off and below or equal to 38° F. (X° F.<T<38° F.) and the humidity H is greater than 50% (H>50%).

13. The method of claim 10, further comprising initiating a cascade off loop in an event a second predetermined environmental condition is met and turning the at least one heating element off.

14. The method of claim 13 wherein the second predetermined environmental condition is whether an environmental temperature is above 42° F. (T>42° F.) or less than a low-temperature cut-off (T<X° F.) or the humidity is less than a low-humidity cut-off of Y% (H<Y%).

15. The method of claim 10 further, comprising detecting a number of heating elements in the set of heating elements and in an event where the number of heating elements is more than two, initiating a sequence where no more than two heating elements are on for a set period of time.

16. The method of claim 15 wherein at least one heating element is turned off after 90 seconds.

17. The method of claim 10 wherein turning at least one heating element on further comprises a soft-start including providing up to 50% voltage for a first amount of time, increasing an input voltage up to 75% and providing 75% voltage for a second amount of time, and then increasing the provided voltage to 100%.

18. The method of claim 10 deicing an area proximate a lens for a traffic signal with the at least one heating element.

19. The method of claim 18 further, comprising detecting a number of heating elements in the set of heating elements and in an event where the number of heating elements is more than two, initiating a sequence where no more than two heating elements are on for a set period of time.

* * * * *